Patented Feb. 25, 1936

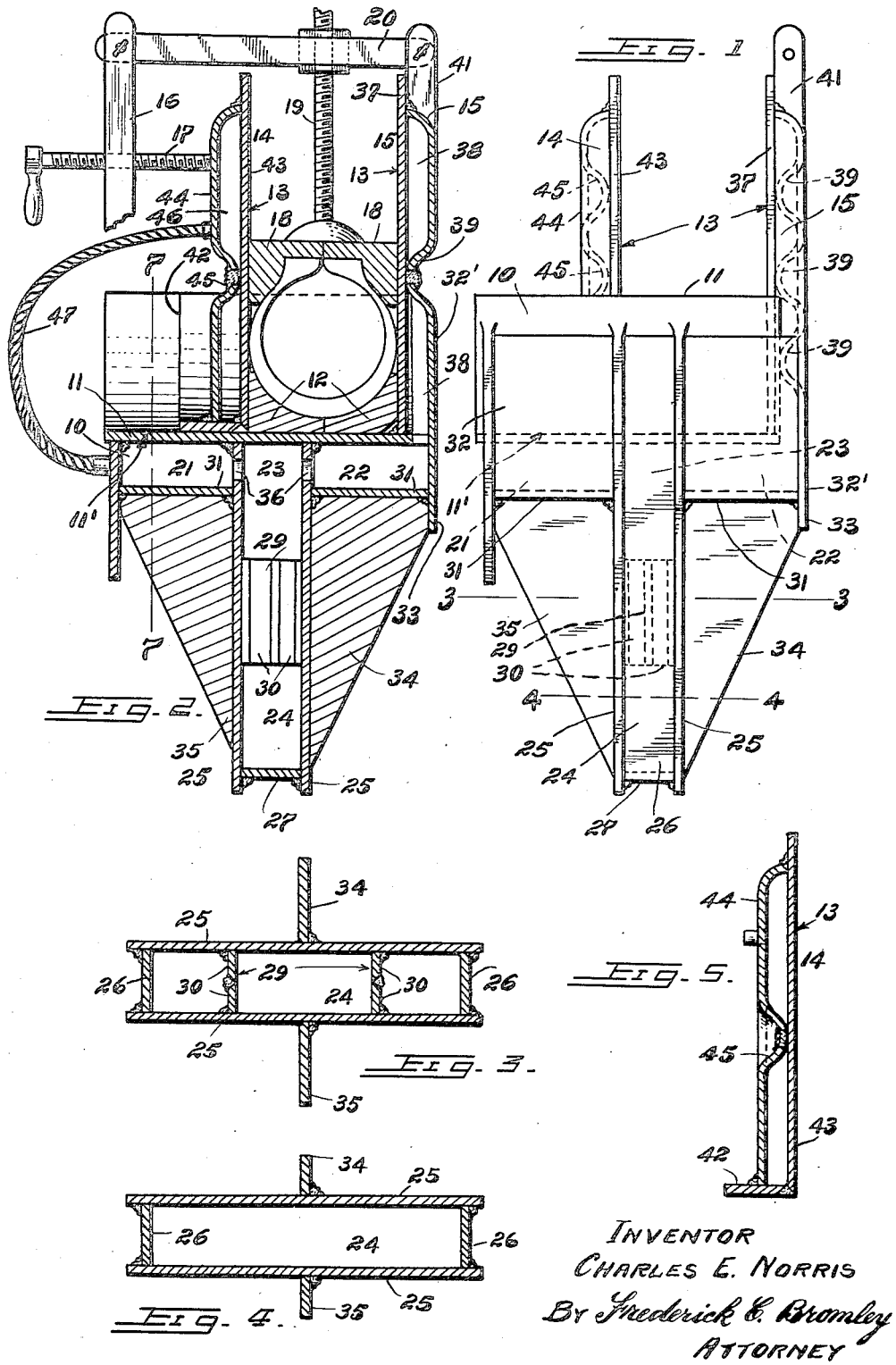

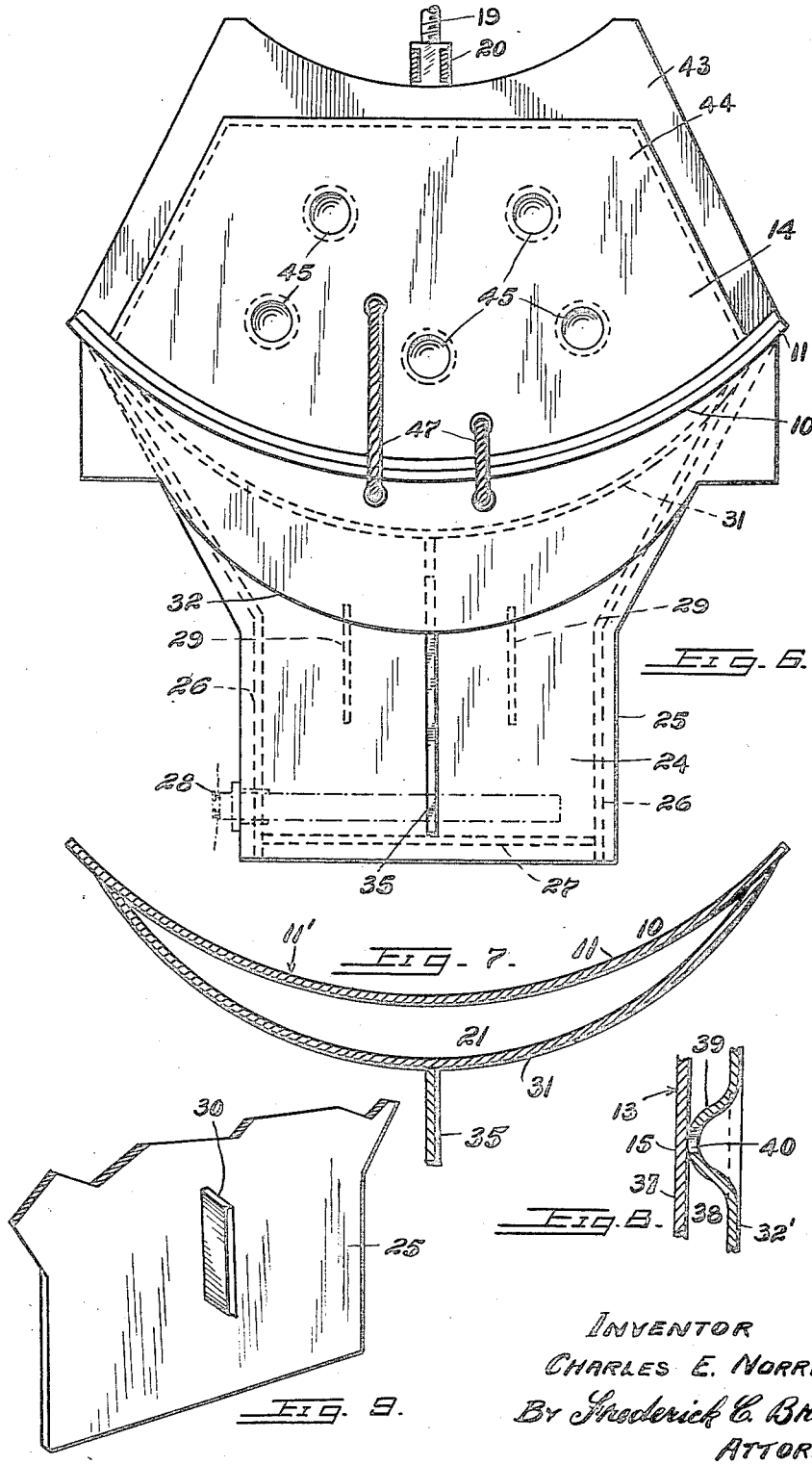

2,032,222

UNITED STATES PATENT OFFICE 2,032,222

TIRE VULCANIZER

Charles E. Norris, London, Ontario, Canada

Application April 28, 1934, Serial No. 722,850

10 Claims. (Cl. 18—18)

The invention relates to improvements in vulcanizers as described in the present specification and shown in the accompanying drawings which form part of the same.

The invention in general appertains to the art of curing local or sectional repairs to pneumatic tire carcasses and in particular to a steam heated vulcanizer equipped with interchangeable parts whereby carcasses of different sized tires may be cured.

In this class of vulcanizer, adapter plates are employed to suit the particular carcass to be cured. These are placed upon the table between relatively adjustable walls along with the carcass and bead plates, all of which are duly clamped in position. The table and walls are chambered in order that they may be heated by steam. The adapter plates conduct the heat to the contacting surface of the carcass to cure the repair.

Due to the modern trend of automobile manufacturers to employ tires of enlarged cross-sectional areas with relatively lower air pressures, vulcanizers are called upon to meet new conditions that severely tax existing machines, if not render them inadequate.

By reason of the bulk and weight of the larger carcasses, stress and strains on the vulcanizing machine are greatly increased. More heat is required in order to cope with the increased size of the adapter plates and other involved parts. Additionally, while these new conditions have to be taken care of, the machine should be more convenient if it is capable of also handling the smaller tires still in use.

The conventional vulcanizer is of a cast iron construction and a machine of this material, to handle tires of increased cross-sectional area, necessitates more substantial walls and greater heating capacity. Since these machines are heated daily, the time taken to get up steam is an important factor, as also is the cost of heating. Naturally, to build a machine of a cast iron construction of a more rigid type with thicker walls would not only take longer to heat but also would increase cost of operation.

The present invention comprehends a vulcanizer construction of welded sheet metal specially designed to incorporate strength and rigidity and yet retain the advantage of metal walls of a less thickness than would be required of a cast iron construction.

According to this construction heat is rapidly conducted to the surface to be vulcanized, which is highly advantageous for carcasses of large cross sections. Furthermore, the structure provides for the quick generation of steam and economical operation irrespective of whether the heating medium is gas or electricity.

The vulcanizer is of the unitary type incorporating a boiler below the table upon which the tire carcass is clamped for curing. A special feature of construction resides in the arrangement of the heated side walls to resist strains and distortion both in the manufacture and use of this vulcanizer.

Referring to the accompanying drawings, Figure 1 is an end elevation of the vulcanizer.

Figure 2 is a vertical sectional view through the machine depicting a tire carcass clamped for vulcanization.

Figure 3 is a horizontal cross section of the boiler taken on line 3—3 of Figure 1.

Figure 4 is a similar section taken on line 4—4 of the same figure.

Figure 5 is a vertical section through the adjustable wall.

Figure 6 is a side elevation of the vulcanizer viewed from the adjustable wall side.

Figure 7 is a cross section taken on line 7—7 of Figure 2 showing the hollow table construction.

Figure 8 depicts the manner of constructing the hollow steam-heated walls.

Figure 9 is a perspective view of one of the side plates of the boiler.

Like numerals of reference indicate corresponding parts in each of the figures throughout the drawings of the invention.

The accompanying drawings are illustrative of a practical application of the invention of which the reference numeral 10 denotes in general the table of the vulcanizer body. The table comprises a top plate 11 presenting an arcuate surface 11' upon which the adapter plates 12 are supported along with the adjustable wall 14. The adapter plates, commonly referred to as "shells", are arcuate complementary members conforming to a substantial section of tread and side walls of the tire and having normal faces contiguous with the table and inner faces 13 of the heated side walls 14 and 15 for the conduction of heat. The adapter plates are made in sets to conform to the tire sizes and are interchangeable as is well known in the art.

As is customary in the art, to provide for changing the adapter plates, the wall 14 is shiftable to and away from its mate and for this purpose it is usual to employ a manual mechanism independently supported with respect to the adjustable wall. The manual mechanism referred to is not a part of the present invention and hence is not shown in detail, it being understood that it may take the form of a supporting member 16 carrying a screw feed or otherwise with means as at 17 for taking the strain at the top of the wall. The usual bead plates are illustrated at 18, which are clamped down by the element 19 loosely carried on the cross-bar 20 as is conventional.

The table is constructed with crescent shaped steam chambers 21 and 22 on each side of an intermediary steam compartment 23 at the top of the boiler 24. This is achieved by welding a pair of spaced depending side plates 25 to the underface of the top plate 11 together with end plates 26 to compose an irregular rectangle in horizontal cross section as clearly discernible in Figures 3 and 4. A bottom plate 27 completes the box-like structure. The joints are of course welded as indicated.

This construction provides a deep vertical boiler for steam generation either by an electric immersion heater as depicted at 28, Figure 6, or by an external gas fire.

It has been ascertained in practice that it is imperative to tie the side plates 25 to each other in their mid areas in order to obviate stress and distortion. This is accomplished by internal stay members 29 welded to the inner faces of the side plates. It was however found impracticable to directly weld the stay members to the side plates due to their welding edges being inaccessible to the welding instruments on account of the narrow width of the boiler.

To overcome this the stay members are each made in two separate plates 30. Each stay plate is welded to a side plate before the boiler is assembled, see particularly Figure 9. Accordingly, the two stay plates of each stay member abut when the side plates are assembled and the abutting edges are accessible for welding to unite them.

To form the steam chambers 21 and 22, curved plates as at 31 are welded to the top plate 11 and to the side plates 25. Additionally a front plate 32 is welded to the said top plate and to the plate 31 of the chamber 21. This curved plate is extended below the plate 31 to act as a strengthening rib. Similarly the back plate 32' is welded to the top plate 11 and to the respective plate 31 and is extended below the latter to form a strengthening rib portion 33. The boiler is further strengthened by opposing ribs 34 and 35. Apertures 36 are cut in the side plates 25 in order to permit steam to pass into the chambers 21 and 22.

The stationary wall 15 is composed of the inner plate 37 welded to the top plate 11 and the back plate 32' aforesaid, which has its sides and upper edge portions bent inwardly and welded to the inner plates 37 to form an interior steam chamber 38 in communication with the chamber 22 of the table.

In order to resist strain and distortion the back plate is indented in several spots as at 39 to draw the metal flush with the inner plate. The indents are centrally apertured as at 40, Figure 8, and welded through the apertures to the inner plate. This is an important feature as it imparts rigidity to the wall to enable it to withstand the strain to which it is subjected. Lugs 41 may be welded to the top of the wall to attach the bar 20.

The adjustable wall 14 is similarly constructed and has an incurvate bottom plate 42 resting contiguously upon the table and welded to the inner plate 43 and to the outer plate 44 similarly constructed with indents 45 as recounted in the description of the back plate 32. The chamber 46 has flexible conduits as at 47 leading to the steam chamber 21 of the table for heating purposes.

Whereas the invention has been described and shown in a practical embodiment, it is understood that changes and modifications may be resorted to as coming within the spirit and scope of the appended claims.

What I claim is:—

1. A sheet metal vulcanizer comprising a heated table, upstanding walls cooperating therewith, said walls each comprising an inner plate, an outer or back plate having its top and side marginal portions inturned and welded to the inner plate to compose an intervening heat chamber, elements uniting the inner plate to the outer or back plate and distributed within the confines of the marginal portions of the outer or back plate to stay the chamber, and closing means for the bottom of said chamber providing a communication with the aforesaid heated table.

2. A sheet metal vulcanizer comprising a heated table, upstanding walls cooperating therewith, said walls each comprising an inner plate, an outer or back plate having its top and side marginal portions inturned and welded to the inner plate to compose an intervening heat chamber, said outer or back plate having local struck up portions welded to said inner plate and disposed within the said marginal portions, and closing means for the bottom of the heat chamber providing a communication with the aforesaid heated table.

3. A sheet metal vulcanizer comprising a heated table, upstanding walls cooperating therewith, said walls each comprising an inner plate, an outer or back plate having its top and side marginal portions inturned and welded to the inner plate to compose an intervening heat chamber, said outer or back plate having spaced indents flush with the inner plate and centrally perforated and welded to the inner plate, and closing means for the bottom of the chamber providing a communication with the aforesaid heated table.

4. A sheet metal vulcanizer comprising a heated table having an upwardly curved supporting surface, a stationary wall welded to the table and formed with a heat chamber communicating with the heated table, an adjustable wall consisting of an inner plate, an outer plate having its top and side marginal portions inturned and welded to the inner plate, said outer plate also having indents struck up flush with the inner plate and welded thereto, and an arcuate bottom plate resting on the curved supporting surface of the heated table and welded to the aforesaid inner and outer plates to complete a heat chamber.

5. A sheet metal vulcanizer comprising a chambered table having an open back, said open back being formed by a top plate and an under plate spaced therefrom between its ends, a shiftable chambered wall resting on the top plate, a stationary wall composed of an inner plate welded to the back edge of said top plate, and a back plate having its top and side marginal portions inturned and welded to the inner plate to compose an intervening heat chamber, said back plate being continued below the top plate and welded to the aforesaid under plate to form a communication with the chamber of the table.

6. A sheet metal vulcanizer comprising a top plate, a depending boiler welded to the underside thereof and having outlet apertures in its steam space, an under plate spaced beneath the top plate and welded thereto and to the boiler to compose a heat chamber with which the apertures communicate, a plate depending from the top plate and welded thereto and to the under plate to complete the heat chamber, chambered walls upstanding from the aforesaid top plate, and means for conducting the heating medium from the boiler to the walls.

7. A sheet metal vulcanizer comprising a top plate, a depending boiler welded to the underside thereof and having outlet apertures in its steam space, an under plate spaced beneath the top plate and welded thereto and projecting beyond the rear thereof, to the boiler to compose a heat chamber with which the apertures communicate, and a pair of chambered walls, one of which consists of an inner plate welded to the said top plate, and a back plate having its top and side marginal portions inturned and welded to the inner plate to compose an intervening heat chamber, said back plate being continued below the top plate and welded to the rearwardly projecting portion of the aforesaid under plate of the heat chamber.

8. A sheet metal vulcanizer comprising an upwardly curved top plate, a depending boiler of a substantially less width than said top plate and welded to the immediate underside thereof, said boiler having lateral outlet apertures in its steam space, an arcuate plate upon each side of the boiler and welded thereto and to the top plate, a depending plate welded to the underside of said top plate and to one of the arcuate plates to compose a chamber in communication with certain of the boiler apertures, and a back plate welded to the other arcuate plate to compose a chamber in communication with the remainder of the apertures, an inner plate welded to the back plate said back plate rising above the top plate, and to the top plate and forming a chamber in communication with the last mentioned chamber.

9. A sheet metal vulcanizer comprising an upwardly curved top plate, a pair of depending side plates welded to the underside thereof and apertured at their upper portions, said side plates extending in the direction of the curve of the top plate, a bottom plate and end plates welded to the side plates thereby composing a boiler, upwardly curved sub-tending plates welded to the said top plate and said side plates, vertical plates welded to the underside of said top plate and to said sub-tending plates to form chambers in communication with said apertures, plates internally welded to the said side plates to stay them, and ribs externally welded to the side plates and to the sub-tending plates of said chambers.

10. A sheet metal vulcanizer comprising an upwardly curved top plate, a pair of spaced depending side plates welded to the underside of the top plate, said plates extending in the direction of the curve of the top plate medially of its width and being apertured in the vicinity of said top plate, plates welded to the ends and the bottoms of said side plates to complete a box-like structure constituting a steam boiler, a heating unit disposed in the boiler, an upwardly curved plate disposed at each side of the boiler and welded to the side plates thereof, said curved plates having their ends welded to the top plate, a vertical plate welded to one of the curved plates and to the top plate to compose a steam chamber therewith communicating through the apertures of the adjacent side plate with the boiler, a back plate welded to the other curved plate and upwardly extending in spaced relation to the top plate so as to provide an intervening steam passage, said back plate having its side and top edges inturned, an inner plate welded to said inturned edges of the back plate and to the adjacent edge of the top plate to compose therewith a steam chamber, and a chambered wall rising from the top plate and adapted to be heated by said boiler.

CHARLES E. NORRIS.